United States Patent [19]

Suzuki et al.

[11] Patent Number: 5,718,753
[45] Date of Patent: Feb. 17, 1998

[54] COLORED METALLIC PIGMENT AND PREPARATION THEREOF

[75] Inventors: Masakazu Suzuki, Kakogawa; Hiroshi Nakaminami, Nishinomiya; Seiji Homma, Kobe, all of Japan

[73] Assignee: Ciba Specialty Chemicals Holding, Inc., Basel, Switzerland

[21] Appl. No.: 730,450

[22] Filed: Oct. 15, 1996

[30] Foreign Application Priority Data

Oct. 20, 1995 [EP] European Pat. Off. ............. 95810653

[51] Int. Cl.⁶ ...................................... C09C 1/62
[52] U.S. Cl. ................. 106/403; 106/404; 106/493; 106/494; 106/495; 106/496; 106/497; 106/498
[58] Field of Search .................... 106/403, 404, 106/493–498; 428/403

[56] References Cited

U.S. PATENT DOCUMENTS

| 2,071,156 | 2/1937 | Baer ........................................ 134/76 |
| 5,037,475 | 8/1991 | Chida et al. ............................ 106/403 |
| 5,506,053 | 4/1996 | Hubbard ................................. 428/402 |
| 5,562,763 | 10/1996 | Bruckner et al. ...................... 106/403 |

FOREIGN PATENT DOCUMENTS

| 0 266 247 | 5/1988 | European Pat. Off. . |
| 0 402 943 | 12/1990 | European Pat. Off. . |
| 4 211 560 | 10/1993 | Germany . |
| 58-141248 | 8/1983 | Japan . |
| 60-029401 | 2/1985 | Japan . |
| 60-029402 | 2/1985 | Japan . |
| 63-118098 | 5/1988 | Japan . |
| 1-153761 | 6/1989 | Japan . |
| 2-142862 | 5/1990 | Japan . |

OTHER PUBLICATIONS

Edwards et al., Aluminum Paint and Powder, 1955, pp. 188–189, Rheinhold, New York.

Takizawa, Masami. "Development and Application of Colored Metallic Pigments", *Toso to Toryo* (466) 50–5 (Japan), 1990.

*Primary Examiner*—Deborah Jones
*Attorney, Agent, or Firm*—Wenderoth, Lind & Ponack

[57] ABSTRACT

The instant invention relates to a process for the production of colored metallic pigments, as well as these colored metallic pigments themselves, their use to color high molecular weight organic material in the mass and compositions or masterbatches containing them.

The colored metallic pigment consists essentially of multiple loose particles of 0.1–1000 μm size each, said particles comprising a core of a transition metals, metalloid or alloy, preferably an aluminum flake, and a very fine, substantially continuous, uniform and homogeneous layer of organic pigment particles which is directly in contact with the metallic core. The core may be superficially oxidized.

The colored metallic pigment is prepared by a vacuum deposition process, said process being performed in an apparatus constructed, modified or charged in such a way that the organic pigment gas flows toward the metallic core.

28 Claims, No Drawings

COLORED METALLIC PIGMENT AND PREPARATION THEREOF

The instant invention relates to the field of effect pigments, such as showing a metallic flop for example in coatings. In particular, it pertains to a process for the production of colored metallic pigments, as well as these colored metallic pigments themselves, their use to color high molecular weight organic material and compositions containing them.

With the improvements in quality of life, the demand for diversified colors for interior as well as exterior applications has amply increased. In spite of the differences in needs between interior and exterior applications, the color of goods affects psychologically the purchasing behaviour of consumers to such a large extent that it eventually influences the sales volume and/or marketing achievement of the manufacturers of such goods.

As colorants expressing new color tones, there have been developed and marketed metallic pigments exhibiting metallic luster, pearl mica pigments showing pearlescence, microtitanium pigments with color tones different from those of pearl mica pigments, graphite pigments which exhibit still different color tones, and others. Such inorganic pigments can also consist of a core and a surface layer of different chemical composition, giving rise to interference effects depending on the respective refractive indices and the thickness of the outer layer, as for example a mica covered with titanium dioxide.

However, inorganic compounds have low molar absorptivity and broad absorbance, limiting the color gamut of interference-based pigments. There is a need for purer hues which can only be obtained with organic pigments as colorants. But whereas coating inorganic particles with a surface layer consisting of inorganic compounds is easy and can be simply achieved for example in aqueous solution, combining metallic particles with organic pigments is difficult and known methods do not lead to satisfactory results.

Among such combinations, an aluminum based metallic pigment has been proposed in U.S. Pat. No. 5,037,475, which is produced by coating a metallic pigment core with a polymer having a three dimensional structure, said polymer being thermally made from a radically polymerizable unsaturated carboxylic acid and a monomer having at least three radically polymerizable double bonds, then adsorbing an organic pigment onto the above polymer-covered core in an organic solvent.

U.S. Pat. No. 5,037,475 mentions that such composite pigments (called primary colored metallic pigments) prepared from scaly aluminum flakes exhibit bright metallic colors. Said primary pigments can be further coated with polymer, leading to resinated pigment particles (called secondary colored metallic pigments) which exhibit excellent resistance to shear, water and chemicals.

However, both the above primary and secondary pigments, wherein the reflective core and the adsorbed colored particles are separated by a polymer layer, do still not entirely satisfy the need for high color intensity and high reflectance. Moreover, it is necessary to grind the colored organic pigment, and the adsorbed colored pigment particles are easily removed. Finally, the process of producing the aforementioned colored metallic pigments is complicated, as it comprises many steps (at least two of which requiring the use of solvents).

DE-4211560 describes a spray-drying process for the preparation of composite pigments, particularly such containing preferably at least 40% by weight of inorganic pigment particles. Although the use of metal platelets and organic pigments are each mentioned, this method does not lead to satisfactory results when metal platelets are used together with organic pigments. This is especially true for easily oxidisable metals, which are altered by water upon spray-drying and thus do not retain the desired properties such as high reflectance. The metal's undesired oxidation can even take an uncontrollable, exothermic and very dangerous path. The results obtained upon spray-drying suspensions of metal particles and organic pigments are disappointing particularly when transparent organic pigments are used, possibly due to the high aggregation tendency of small-sized particles; the organic pigment layer is clearly discontinuous as well as poorly uniform and homogeneous. The products obtained by spray-drying suspensions of metal particles and organic pigments still do not meet all the requirements to colored effect pigments.

JP Kokai No. Sho 63-118098 describes a method for coloring aluminum-made wares by vacuum evaporation, according to which the aluminum-made ware to be colored is at first subjected to electrochemical oxidation so that an aluminum oxide layer is provided, onto which organic pigments are then deposited under a decreased pressure. This method enables the production of aluminum-made wares with uniform and brilliant colors.

However, the method according to JP Kokai No. Sho 63-118098 requires positioning the material to be coated above the material to be sublimed, without any barrier such as a cup between the two. It is therefore applicable only to articles which can be manipulated one by one, requiring sizeable dimensions such as a length or width of at least several centimeters. It cannot be used in practical scale for coloring metallic particles or flakes with a particle size less than about 1 mm, and fails completely for pigment particles which are smaller than 10 µm, due to the impossibility to handle such small particles one by one in order to position them as required. Moreover, it is necessary in this method to oxidize electrochemically the article to be colored before vacuum evaporation, which step complicates the process and may alter the reflectance at the aluminum surface.

Surprisingly, it has now been found that a colored metallic pigment, consisting essentially of multiple loose particles of 0.1–1000 µm size each, said particles comprising a metallic core and a layer of organic pigment particles which is directly in contact with said metallic core, can nevertheless be prepared by a vacuum deposition process, provided that the apparatus in which said process is performed is constructed or charged in such a way that the organic pigment gas flows toward the metallic core. This process avoids the use of solvents, and highly surprisingly makes possible the production of colored metallic pigments exhibiting extraordinary high color intensity and high reflectance.

The metallic core may be a metallic particle of any shape, preferably flat and of smooth surface, most preferably a metallic flaky pigment. The layer of very fine organic pigment particles is surprisingly continuous, uniform and homogeneous, and its thickness can be easily controlled.

Thus, a subject-matter of the present invention is a colored metallic pigment comprising a metallic core and a very fine, substantially continuous, uniform and homogeneous layer of organic pigment particles which is directly in contact with said metallic core. Preferably, the layer of organic pigment particles is 0.001–2 µm thick. More preferably, the layer of organic pigment particles is 0.01–1 µm thick. Most preferably, the layer of organic pigment particles is 0.01–0.1 µm thick.

Examples of metallic particles or flakes eligible for use as the metallic core in the instant invention include those of transition metals, such as scandium, titanium, vanadium, yttrium, chromium, manganese, iron, cobalt, nickel, copper, zinc, zirconium, niobium, molybdenum, ruthenium, rhodium, palladium, silver, cadmium, lanthanum, hafnium, tungsten, rhenium, osmium, iridium, platinum and gold, metalloids, such as boron, carbon, especially graphite, aluminum, silicon, gallium, germanium, selenium, indium, tin, antimony, tellurium, thallium, lead and bismuth, and metallic alloys, such as stainless steel and bronze.

The metallic core may be superficially oxidized. Due to their higher reactivity towards oxygen and humidity, particles of metals and metalloids having negative oxidation potentials, such as scandium, titanium, vanadium, yttrium, manganese, iron, cobalt, nickel, zinc, zirconium, cadmium, lanthanum, aluminum, gallium, selenium, indium, antimony, tellurium and thallium, are particularly subject to surface oxidation.

As metallic cores, particles or flakes of aluminum are especially preferred.

Advantageously, the metallic core has a particle size of 0.1–1000 μm, preferably 0.5–500 μm, most preferred 1–100 μm, measured in the longest axis. In the case of a metallic flake, the particle size is preferably 0.1–1000 μm in the longest axis and 0.01–500 μm in the shortest axis, more preferably 0.5–500 μm in the longest axis and 0.05–100 μm in the shortest axis, most preferably 1–100 μm in the longest axis and 0.1–10 μm in the shortest axis.

Organic pigments which can be used in the instant invention are for example quinacridones, perylenes, dioxazines, anthraquinones, indanthrones, flavanthrones, indigos, thioindigos, quinophthalones, isoindolinones, isoindolines, diketopyrrolopyrroles, dithioketopyrrolopyrroles, triphenylmethanes, phthalocyanines, metal complexes and azo-pigments. Mixtures of two or more organic pigments of the same or of different classes may also be used.

Preferred pigments are:

1) perylenecarboxylic acid imides or anhydrides of formula

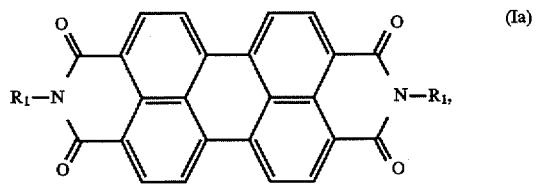

(Ia)

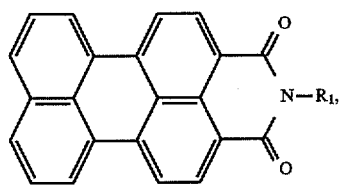

(Ib)

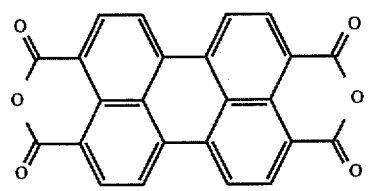

(Ic)

or

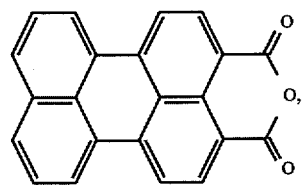

(Id)

wherein $R_1$ is hydrogen, $C_1$–$C_6$-alkyl, phenyl, benzyl or phenethyl which are unsubstituted or substituted by halogen, $C_1$–$C_4$-alkyl or $C_1$–$C_4$-alkoxy;

2) quinacridones of formula

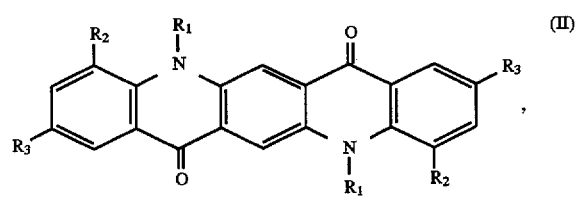

(II)

wherein $R_2$ and $R_3$ are each independently of the other hydrogen, halogen, $C_1$–$C_{18}$-alkyl, $C_1$–$C_4$-alkoxy or phenyl and $R_1$ has the same meaning as above;

3) dioxazines of formula

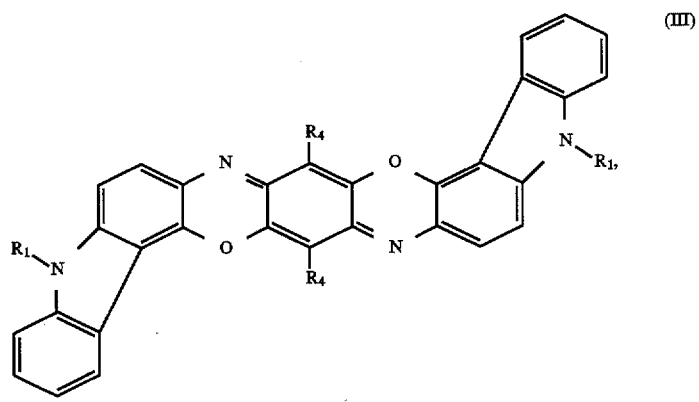

(III)

wherein $R_4$ is hydrogen, halogen or $C_1$–$C_{18}$-alkyl and $R_1$ has the aforementioned meaning;

4) isoindolines of formula

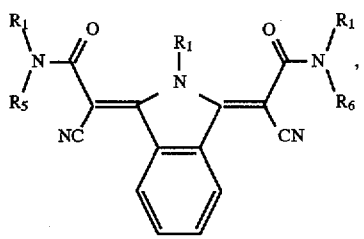 (IV)

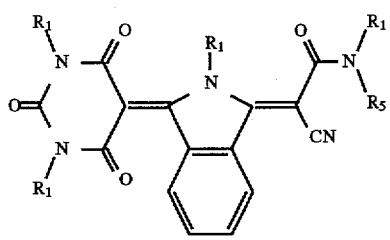 (V)

or

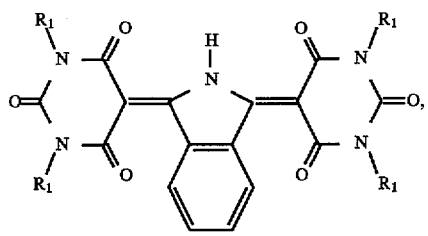 (VI)

wherein $R_5$ is a group

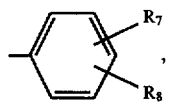, $R_6$ is hydrogen, $C_1$–$C_{18}$-alkyl, benzyl or a group

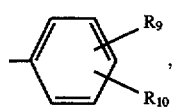, $R_7$, $R_8$, $R_9$ and $R_{10}$ are each independently of the other hydrogen, $C_1$–$C_{18}$-alkyl, $C_1$–$C_4$-alkoxy, halogen or trifluoromethyl, and $R_1$ has the same meaning as above;

5) isoindolinones of formula

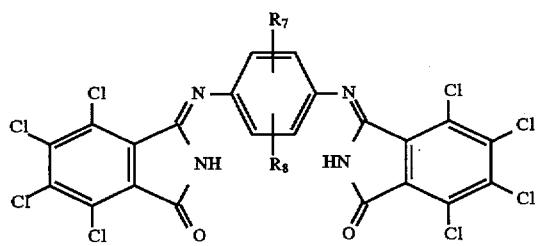 (VII)

or

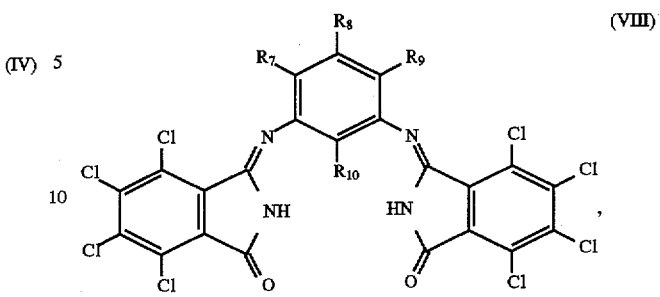 (VIII)

wherein $R_7$, $R_8$, $R_9$ and $R_{10}$ have the same meaning as above;

6) indigo derivatives of formula

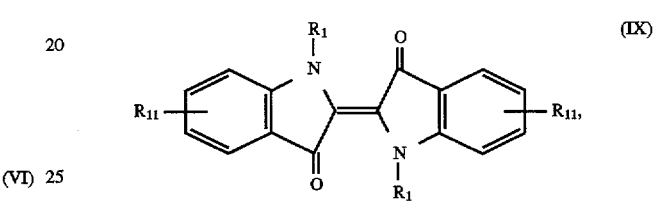 (IX)

wherein $R_{11}$ is hydrogen, CN, $C_1$–$C_4$-alkyl, $C_1$–$C_4$-alkoxy or halogen and $R_1$ has the same meaning as above;

7) benzoimidazolone-azo compounds of formula

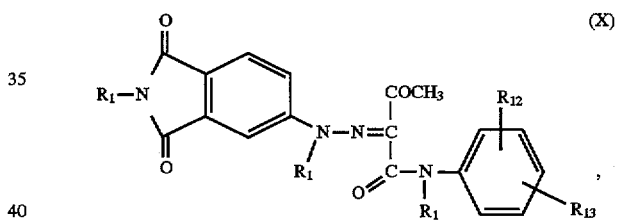 (X)

wherein $R_{12}$ and $R_{13}$ are each independently of the other hydrogen, halogen, $C_1$–$C_4$-alkyl or $C_1$–$C_4$-alkoxy and each $R_1$ has independently from the other the same meaning as above;

8) anthraquinoide compounds of formula

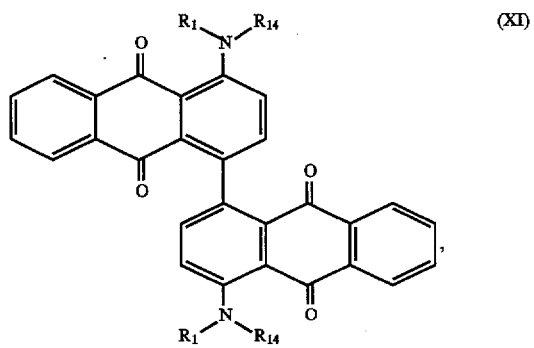 (XI)

wherein $R_1$ has the same meaning as above, and $R_{14}$ is hydrogen, $C_1$–$C_6$-alkyl, phenyl, benzyl or phenethyl which are unsubstituted or substituted by halogen;

9) flavanthrone compounds of formula

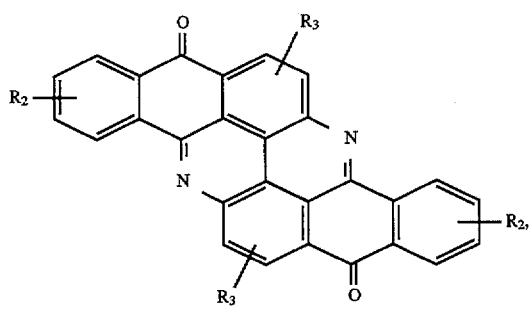

(XII)

wherein $R_2$ and $R_3$ have each independently of the other the same meaning as above;

10) indanthrone compounds of formula

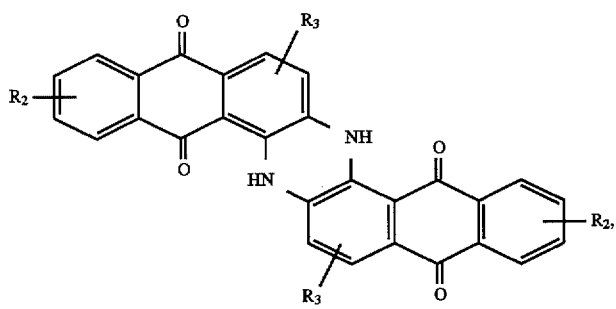

(XIII)

wherein $R_2$ and $R_3$ have each independently of the other the same meaning as above;

11) phthalocyanine compounds of formula

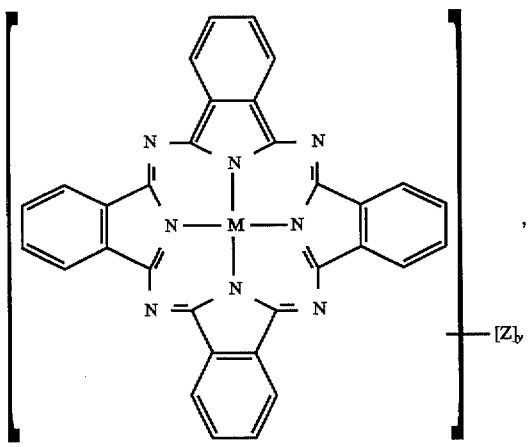

(XIV)

wherein M is $H_2$, Zn, Cu, Ni, Fe, Ti or V, preferably $H_2$, Zn or Cu,

Z is halogen or a group —X—N($R_1$)($R_{15}$),

X is a direct bond, —CH($R_{16}$)— or —SO$_2$—, preferably a direct bond, —CH$_2$— or —SO$_2$—, $R_1$ has the same meaning as above, $R_{15}$ is hydrogen, $C_1$–$C_4$-alkyl, —N($R_1$)$R_{16}$, —NHCOR$_{17}$, —COR$_{17}$ or

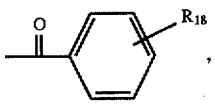

preferably hydrogen, —NHCOCH$_3$ or benzoyl, $R_{16}$ is hydrogen or $C_1$–$C_4$-alkyl, $R_{17}$ is $C_1$–$C_4$-alkyl or phenyl, $R_{18}$ is hydrogen, halogen, $C_1$–$C_4$-alkyl or $C_1$–$C_4$-alkoxy, and y is 0 or an integer from 1 to 4;

12) pyrrolo(3,4-c)pyrroles of formula

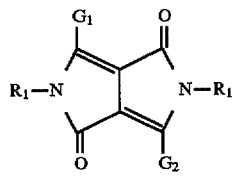

(XV)

wherein $G_1$ and $G_2$ are each independently of the other a group of formula

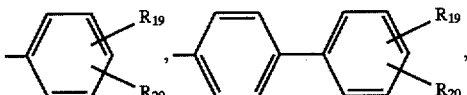

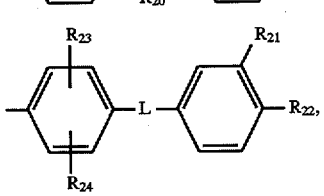

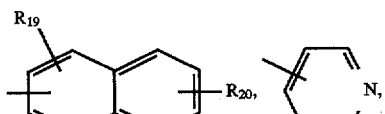

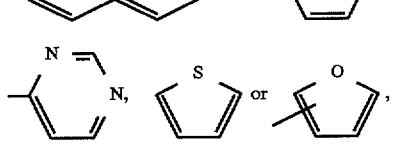

in which $R_{19}$ and $R_{20}$ are each independently of the other hydrogen, halogen, $C_1$–$C_{18}$-alkyl, $C_1$–$C_{18}$-alkoxy, $C_1$–$C_{18}$-alkylmercapto, $C_1$–$C_{18}$-alkylamino, $C_2$–$C_{18}$-dialkylamino, —CN, —NO$_2$, phenyl, trifluoromethyl, $C_5$–$C_6$-cycloalkyl, imidazolyl, pyrazolyl, triazolyl, piperazinyl, pyrrolyl, oxazolyl, benzoxazolyl, benzthiazolyl, benzimidazolyl, morpholinyl, piperadinyl, pyrrolidinyl, —C=N—($C_1$–$C_{18}$-alkyl) or

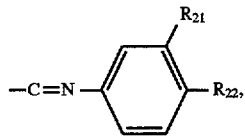

$R_{21}$ and $R_{22}$ are each independently of the other hydrogen, halogen, $C_1$–$C_6$-alkyl, $C_1$–$C_{18}$-alkoxy or —CN, $R_{23}$ and $R_{24}$ are each independently of the other hydrogen, halogen or $C_1$–$C_6$-alkyl, L is —CH$_2$—, —CH(CH$_3$)—, —C(CH$_3$)$_2$—, —CH=N—, —N=N—, —O—, —S—, —SO—, —SO$_2$— or —NR$_{25}$—, R$_{25}$ is hydrogen or $C_1$–$C_6$-alkyl, and $R_1$ has the same meaning as above.

Halogen is for example iodine, fluorine, particularly bromine and preferably chlorine. $C_1$–$C_4$-alkyl is for example methyl, ethyl, n-propyl, isopropyl, n-butyl, sec.-butyl or tert.-butyl, $C_1$–$C_6$-alkyl may be $C_1$–$C_4$-alkyl or for example also n-amyl, tert.-amyl or hexyl, and $C_1$–$C_{18}$-alkyl may be $C_1$–$C_6$-alkyl or for example also heptyl, octyl, 2-ethylhexyl, nonyl, decyl, dodecyl, tetradecyl, hexadecyl or octadecyl. $C_1$–$C_4$-alkoxy is for example methoxy, ethoxy, n-propoxy, isopropoxy, butyloxy, and $C_1$–$C_{18}$-alkoxy may be $C_1$–$C_4$-alkoxy or for example alsohexyloxy, decyloxy, dodecyloxy, hexadecyloxy oder octadecyloxy. $C_1$–$C_{18}$-alkylthio is for example methylthio, ethylthio, propylthio, butylthio, octylthio, decylthio, hexadecylthio or octadecylthio. $C_1$–$C_{18}$-alkylamino is for example methylamino, ethylamino, propylamino, hexylamino, decylamino, hexadecylamino or octadecylamino. $C_2$–$C_{18}$-dialkylamino, wherein the number of carbon atoms in both alkyl groups is added, is for example dimethylamino, diethylamino, methylpropylamino, ethylhexylamino, methyldecylamino, dioctylamino or ethylhexadecylamino.

The above pigments are well-known in the art and are prepared by known methods. Many are commercially available. Should some of them still be new, they can be prepared by known techniques from known materials similarly to the known pigments.

Among the above preferred organic pigments, those selected from the group consisting of indanthrone, flavanthrone, quinacridone, phthalocyanine and pyrrolo(3, 4-c)pyrrole pigments are especially preferred: Most preferred organic pigments are such selected from the group consisting of quinacridone, phthalocyanine and pyrrolo(3, 4-c)pyrrole pigments.

The organic pigments useful as starting material can be composed of usual fine particles, such as having to a specific surface area in the range from 40 to 100 m$^2$/gram, determined by the BET method. It is however also possible to use organic pigments of higher particle size, such as having a specific surface area in the range from 1 to 40 m$^2$/gram. It is even possible to use organic pigments in aggregated, raw, amorphous or non-pigmentary form, with particle sizes up to several millimeters. The starting organic pigments can possess any crystal modification, even that of low coloristic value, because the crystal modification of the layer deposited by vapor deposition depends mainly on the vapor deposition conditions, and is not necessarily the same as the crystal modification of the starting organic pigments.

The metallic pigment according to the instant invention can be produced by coating a metallic core with at least one organic pigment by vacuum evaporation in an apparatus which is constructed or charged in such a way that the organic pigment gas or plasma flows toward the metallic core. This can be accomplished for example by placing within the vacuum evaporation apparatus an additional device, such as a reversed cup-like hot roof (heated deflector) or a horn-shaped tube, the purpose of said device being to deflect the pigment gas or plasma toward the metallic core to be coated. Another possibility is to place the pigment to be evaporated within a container situated above the metallic core to be coated, said container having one or more openings only at its bottom. A further possibility is to let the pigment particles move in countercurrent to the ascending organic pigment gas or plasma. Still another possibility is to charge the pigment particles and the metallic core to be coated together in the same container, which is preferably agitated in order to well distribute the particles and the starting pigment.

Any conventional vacuum evaporation apparatus may be modified or settled as required in order for the invention to be performed. It is preferred, however, that the apparatus is modified in such a way that the metallic particles or flakes are placed near to the evaporation source because of the efficiency in depositing the organic pigment onto the metallic particles or flakes. With this geometry it is preferred that the apparatus is provided with a hot roof placed above the evaporation source so that it heats the vapour of the organic pigment during the evaporation process in order to avoid the condensation of the vapourized pigment before deposition onto the metallic particles or flakes. The hot roof can be provided simply by placing a heating element inside a bell jar over the evaporation source. The heating element can be made for example by winding a heating wire, for example tungsten wire, nickel-chromium wire or Kanthal wire, around a heat resistant, insulative body having for example a cone shape. The heat resistive body can be made of for example alumina, zirconia or titania. The heating wire is connected for example to a voltage-variable power source placed outside the bell jar.

It is further preferred that the apparatus is equipped with a device for vibrating the metallic particles of flakes so as to achieve homogeneous deposition of the organic pigment onto the metallic particles or flakes. Examples of such vibrating units are described for example in JP Kokai No. Sho 48-36082, JP Kokai No. Sho 58-31076 and JP Kokai No. Sho 61-30863. Any of such vibrating units can be employed in the instant invention. A vibrating unit can be constructed, as described in these publications, by placing a loudspeaker below the evaporation source, said loudspeaker being connected through an amplifier to a function generator, both being placed outside the bell jar.

The vacuum evaporation apparatus eligible for use in the instant invention is preferably provided with the above means, namely, a hot roof and a vibrating unit. Most preferably, metallic particles or flakes are firstly placed on the above loudspeaker which simultaneously acts as a sample holder and a vibrating unit. Then, the bell jar is put at the predetermined position followed by degassing the whole system. The pressure inside the bell jar is preferably less than 40 mPa, more preferably less than 4 mPa, most preferred less than 0.4 mPa. Subsequently, the evaporation source, the hot roof and the vibrating unit are switched on. The temperatures of the evaporation source as well as of the hot roof are determined in accordance with the sublimation temperature of the organic pigment to be deposited. Organic pigments to be used in the instant invention usually have sublimation temperatures of 250°–400° C., so that the temperatures of the evaporation source and the hot roof are normally selected within this range. The temperature of the evaporation source is not necessarily the same as that of the hot roof; in general, the temperature of the hot roof is lower than that of the evaporation source. The vibrating unit is driven at a frequency of 10 Hz–100 KHz, preferably 10 Hz–50 kHz, most preferred 10 Hz–5 kHz. The deposition time should be determined according to the desired results. After the completion of vacuum evaporation, the bell jar is opened and the colored metallic particles or flakes are obtained.

Apart from the above explained vacuum evaporation apparatus provided with a hot roof and a vibrating unit, it is also possible to modify the evaporation apparatus or to replace it with any other apparatus fitting the requirement that the organic pigment gas or plasma flows toward the metallic core, for example one of those described below:

The evaporation source and the hot roof can be unified by constructing a horn-shaped tube around which a heating wire is wound, one end of said horn-shaped tube having an opening which is directed downwards and the other end being closed, the organic pigment being placed at the closed end and heated during vacuum evaporation by the heating wire. In this construction, it is preferred that the winding density of the heating wire is higher in the vicinity of the closed end. The electric current fed to the heating wire may for example be supplied from a variable power source located outside the bell jar.

The evaporation source and the hot roof can be unified by constructing a cone-like or half spherical vessel fitted with a bottom having at least one opening, said vessel containing the organic pigment and being fitted with a heating unit inside or outside it, and the particles or flakes being placed in another vessel positioned below the first one. The organic pigment is placed at the bottom of said cone-like or half spherical vessel, by the side of the opening. Said heating unit may for example be a wound resistive wire to which electricity is fed by a variable power source placed outside the bell jar. The second vessel wherein the particles or flakes are placed should be upside wide open and may for example be a loudspeaker.

A rotatable cylindrical tube both ends of which unconventionally are closed is employed as a new and simple vacuum evaporation apparatus. The metallic particles or flakes and the organic pigment are charged in this tube which, during vacuum evaporation, is rotated horizontally around its axis and heated by means of for example a heating wire. In this method, only the interior of the cylindrical tube necessitates to be kept under a decreased pressure. This can be accomplished by providing the tube with an outlet through which the metallic particles or flakes and the organic pigment are charged and the air is evacuated. The rotation of the cylindrical tube's axis can be for example driven by an electric motor. The electric power for the heating wire may be provided to the cylindrical tube for example by using sliding contacts. Equivalent means may also be used for heating and rotation.

A column-like vessel having at least one side branch provided with a heating unit is unconventionally used as a new vacuum evaporation apparatus, the organic pigment being placed at the bottom of the heated side branch and the metallic particles or flakes passing at least temporary in front of the side branch. The heating unit at the branch may for example be a wound resistive wire. Preferably, this vessel is equipped with a device which lifts the metallic particles or flakes upwards from the bottom of the column, where they may be charged at the beginning of the process, and then allows them to drop downwards. This can be achieved for example by placing an iron-made spoon-like tray inside the column. By means of a magnet capable of rotating and moving upwards and downwards outside the column, a portion of the metallic particles or flakes placed on the bottom of the column can be lifted upwards with the spoon by moving the magnet upwards and then allowed to drop by rotating said magnet to empty the spoon. The metallic particles or flakes then fall to the bottom, countercurrent to the ascending pigment gas. This operation is preferably repeated continuously during the whole vacuum evaporation process, while the system composed of the column and branch is kept all the time under vacuum.

The colored metallic pigment according to the instant invention exhibits an extraordinarily high color intensity as well as high reflectance since a substantially continuous, uniform and homogeneous layer of fine organic pigment particles as small as 0.1 µm or less covers each of the aluminum particles or flakes.

Said substantially continuous, uniform and homogeneous layer of organic pigment particles has, as stated above, preferably a thickness of 0.001–2 µm, more preferably 0.01–1 µm, most preferred 0.01–0.1 µm.

Typically, the substantially continuous, uniform and homogeneous layer covers at least 90% of the core's surface, varies at most 20% in thickness, and no changes in crystallinity can be detected along the core's surface by using usual methods such as for example scanning electron microscopy. Preferably, it covers at least 95% of the core's surface and varies at most 10% in thickness. The substantially continuous, uniform and homogeneous layer most preferably covers the whole surface so that on most particles no holes in the pigment layer can be recognized by using scanning electron microscopy.

The organic pigment particles deposited as a layer on the metallic core are very fine, usually smaller than 0.1 µm, independently of the starting material's particle size. This makes advantageously possible to use as starting material pigments of big particle size, for example several µm, without having to grind or condition them prior to the deposition process, while still getting thin layers of very fine particle size organic pigments.

Particularly remarkable are the coloristic properties of colored metallic pigments wherein the size of the organic pigment particles in the layer directly in contact with the core is from 0.05 µm to 0.1 µm.

Polymeric materials can be colored in the mass by an effective coloring amount of the instant colored metallic pigment. The instant colored metallic pigment can be used as it is, or preferably in encapsulated form. In the latter case, any of the known encapsulation methods for organic pigments may be used. Polymeric materials which can be colored by the instant colored metallic pigment are high molecular weight organic materials, such as cellulose ether, cellulose ester, polyurethane, polyesters, polycarbonate, polyolefin, polystyrene, polysulfone, polyamide, polycycloamide, polyimide, polyether, polyether ketone, polyvinyl halide, polytetrafluoroethylene, acrylic or methacrylic polymer, rubber, silicone polymer, phenol/ formaldehyde resin, melamine, formaldehyde resin, urea/ formaldehyde resin, epoxy resin, diene rubber or copolymers thereof, preferably polyvinyl chloride. The unresinated instant colored metallic pigment is particularly suitable to color polymeric materials which are processed in the absence of solvents.

The instant metallic pigment can also advantageously be used in pigment compositions or masterbatches, comprising an effective pigmenting amount of said colored metallic pigment and a polymer into which said pigment is embedded, for example a crosslinked polymer as described in U.S. Pat. No. 5,037,475 (secondary pigment). Other examples of polymers which can be used in compositions or masterbatches include, but are not limited to, the high molecular weight organic materials cited above. Preferably, a polymer which is compatible or identical with the polymers used in the main foreseen application area should be chosen. Which polymers can be used for which application areas is well-known in the art.

Instead or in addition to the polymer, and depending on the end use, the instant pigment compositions or masterbatches can advantageously also contain specific amounts of customary additives, in particular rheology improving agents and/or texture improving agents, which are both well-known in the art.

Suitable texture improving agents are, in particular, fatty acids of at least 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/maleate resins or fumaric acid/colophonium resins or polymeric dispersants. The texture improving agents are preferably added in amount of 0.1 to 30%, by weight, most preferably 2 to 15% by weight, based on the final product.

Heat-curable coatings or cross-linking, chemically-reactive coatings, can also be colored by an effective coloring amount of the instant colored metallic pigment. Examples of the pigmented, high molecular weight organic materials which are used in coatings include acrylic, alkyd, epoxy, phenolic, melamine, urea, polyester, polyurethane, blocked isocyanate, benzoguanamine or cellulose ester resins, and combinations thereof.

The present pigments are also suitable for preparing industrial coatings and those conventionally employed in the automobile industry, especially in thermosetting resins such as acrylic/melamine resin, alkyd/melamine resin or thermoplastic acrylic resin systems, as well as in aqueous-based coating systems. The present pigment compositions are suitable for coloring solvent-borne and water-borne automotive finishes.

In any of the above mentioned application fields, the instant colored metallic pigment may be used as the single coloring agent. It may however also be used in mixtures with one or more other coloring agents, as well as in mixtures with one or more other reflecting particles. Particularly, the instant colored metallic pigment may be used in combination with other organic pigments, such as for example quinacridones, perylenes, dioxazines, anthraquinones, indanthrones, flavanthrones, indigos, thioindigos, quinophthalones, isoindolinones, isoindolines, diketopyrrolopyrroles, dithioketopyrrolopyrroles, triphenylmethanes, phthalocyanines, metal complexes and azo-pigments, with other effect pigments such as mica, graphite or molybdenum disulfide, or with combinations thereof.

An effective pigmenting amount is any amount suitable to provide the desired color. In particular, the pigment compositions are used for the mass-coloration of polymer or coating compositions in an amount of 0.01 to 30% by weight, preferably 0.1 to 10% by weight, based on the weight of the material to be colored.

The invention is illustrated by the following examples, to which the scope of the invention is however by far not limited, as the skilled artisan will easily recognize:

EXAMPLE 1

A commercial vacuum evaporation apparatus (EBV-6DA, a product of ULVAC Ltd., Kanagawa, Japan) is modified so as to be provided with a loudspeaker and a hot roof placed respectively below and over the evaporation source. The loudspeaker is driven by a function generator (Model 191, WAVETEC, San Diego, USA) through a 4-channel amplifier (Model SC-P70, Toshiba, Tokyo, Japan). The hot roof is made of an insulated stainless steel cone around which nickel-chromium resistive wire is wound. The temperature of the hot roof is controlled by means of an automatic temperature controller.

42 mg of 1,4-diketo-2,5-dihydro-3,6-bis(4-chlorophenyl) pyrrolo-[3,4-c]-pyrrole (prepared as described in U.S. Pat. No. 4,579,949; hereinafter, referred to as $Cl_2$-DPP) and 0.125 g of aluminum flakes ("Aluminum, Powder, from Foil" from Wako pure Chemical Industry, Ltd.) are charged into the respective source and target area of the above apparatus. The vacuum deposition is carried out for 1.5 hours at a pressure of $1.33 \cdot 10^{-11}$ Pa, a hot roof temperature of 300° C. and a loudspeaker vibration frequency of 425 Hz.

The samples thus prepared show a brilliant, bright red color with a metallic tone. Their reflectance in the wavelength range 450–570 nm, where $Cl_2$-DPP has its absorption band, is only about 40% of the reflectance at wavelengths outside this range. Scanning electron microscope (SEM) pictures show that each aluminum flake bears a continuous layer of $Cl_2$-DPP particles of 0.05–0.1 µm size.

EXAMPLE 2

The same procedure as in example 1 is followed, with the difference that only 23 mg of $Cl_2$-DPP are charged, and that the vacuum deposition is carried out for 1.0 hours. The results are similar to those of example 1, with the difference that the reflectance in the wavelength range 450–570 nm is about 30%.

EXAMPLE 3

The same procedure as in example 1 is followed, with the difference that only 15 mg of $Cl_2$-DPP are charged, and that the vacuum deposition is carried out for 0.5 hours. The results are similar to those of example 1, with the difference that the reflectance in the wavelength range 450–570 nm is about 20%.

EXAMPLE 4

400 mg of β-copperphthalocyanine (Tokyo Chemical Industry Co., Ltd.) and 0.125 g of nickel powder (100 mesh, Johnson Mattey) are charged in the source and the vibrating unit, respectively. The vacuum deposition is carried out for 1.0 hour at a pressure of $1.33 \cdot 10^{-11}$ Pa, a hot roof temperature of 380° C. and a vibration frequency of 350 Hz. The sample has CIELAB color values of $L^*=21$, $a^*=-10$, $b^*=-19$.

EXAMPLE 5

It is proceded as in Example 4, with the difference that α-copperphthalocyanine is substituted for β-copperphthalocyanine, with good result.

EXAMPLE 6

400 mg of γ-quinacridone (Ciba-Geigy) and 0.125 g of copper-nickel alloy powder (Ni-Cu, 50–50 wt %, Kojundo Chemical Laboratory Co., Ltd.) are charged in the source and the vibrating unit, respectively. The vacuum deposition is carried out for 1.0 hour at a pressure of $1.33 \cdot 10^{-11}$ Pa, a hot roof temperature of 300° C. and a vibration frequency of 425 Hz. The sample has CIELAB color values of $L^*=35$, $a^*=9$, $b^*=3$.

EXAMPLE 7

It is proceded as in Example 6, with the difference that β-quinacridone is substituted for γ-quinacridone, with good result.

EXAMPLE 8

It is preceded as in Example 6, with the difference that α-quinacridone is substituted for γ-quinacridone, with good result.

EXAMPLE 9

It is proceded as in Example 6, with the difference that 1,9-dimethyl-quinacridone is substituted for quinacridone, with good result.

EXAMPLE 10

It is proceded as in Example 6, with the difference that 1,9-dichloro-quinacridone is substituted for quinacridone, with good result.

We claim:

1. A colored metallic pigment comprising a metallic core and a very fine, substantially continuous, uniform and homogeneous layer of organic pigment particles which is directly in contact with said metallic core.

2. A colored metallic pigment according to claim 1, wherein the metallic core is that of a transition metal, metalloid or alloy.

3. A colored metallic pigment according to claim 1, wherein the layer of organic pigment particles is 0.001–2 μm thick.

4. A colored metallic pigment according to claim 3, wherein the layer of organic pigment particles is 0.01–1 μm thick.

5. A colored metallic pigment according to claim 4, wherein the layer of organic pigment particles is 0.01–0.1 μm thick.

6. A colored metallic pigment according to claim 1, wherein the metallic core is a particle or flake of aluminum.

7. A colored metallic pigment according to claim 1, wherein the metallic core has a particle size of 0.1–1000 μm, measured in the longest axis.

8. A colored metallic pigment according to claim 7, wherein the metallic core has a particle size of 0.5–500 μm, measured in the longest axis.

9. A colored metallic pigment according to claim 8, wherein the metallic core has a particle size of 1–100 μm, measured in the longest axis.

10. A colored metallic pigment according to claim 7, wherein the metallic core is a flake and has a particle size of 0.01–500 μm in the shortest axis.

11. A colored metallic pigment according to claim 8, wherein the metallic core is a flake and has a particle size of 0.05–100 μm in the shortest axis.

12. A colored metallic pigment according to claim 9, wherein the metallic core is a flake and has a particle size of 0.1–10 μm in the shortest axis.

13. A colored metallic pigment according to claim 1, wherein the organic pigment is a single pigment or a mixture of pigments selected from the group consisting of quinacridones, perylenes, dioxazines, anthraquinones, indanthrones, flavanthrones, indigos, thioindigos, quinophthalones, isoindolinones, isoindolines, diketopyrrolopyrroles, dithioketopyrrolopyrroles, triphenylmethanes, phthalocyanines, metal complexes and azo-pigments.

14. A colored metallic pigment according to claim 13, wherein the organic pigment is a single pigment or a mixture of pigments selected from the group consisting of 1) a perylenecarboxylic acid imide or anhydride of the formula

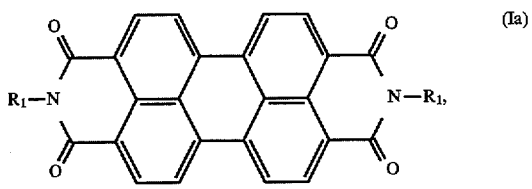

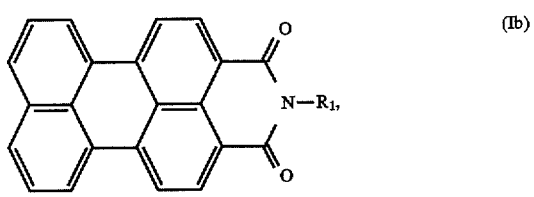

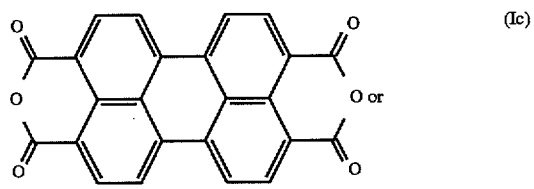

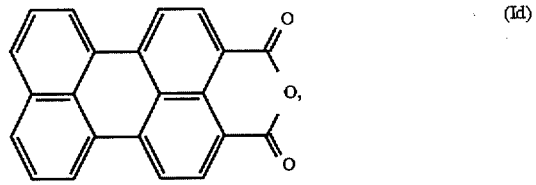

wherein $R_1$ is hydrogen, $C_1$–$C_6$-alkyl, phenyl, benzyl or phenethyl which are unsubstituted or substituted by halogen, $C_1$–$C_4$-alkyl or $C_1$–$C_4$-alkoxy;

2) a quinacridone of the formula

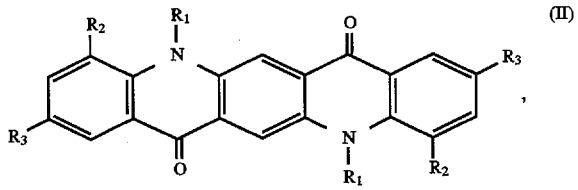

wherein $R_2$ and $R_3$ are each independently of the other hydrogen, halogen, $C_1$–$C_{18}$-alkyl, $C_1$–$C_4$-alkoxy or phenyl and $R_1$ has the same meaning as above;

3) a dioxazine of the formula

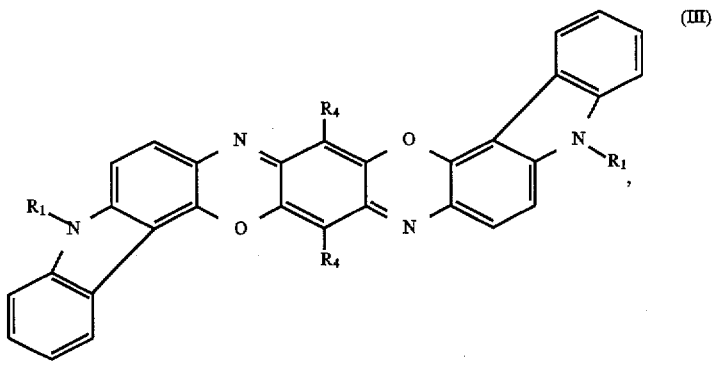

wherein $R_4$ is hydrogen, halogen or $C_1$–$C_{18}$-alkyl and $R_1$ has the aforementioned meaning;

4) an isoindoline of the formula

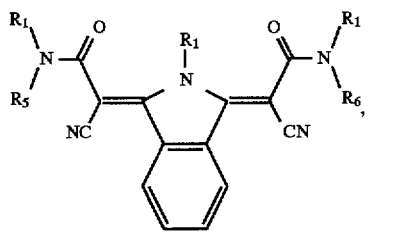  (IV)

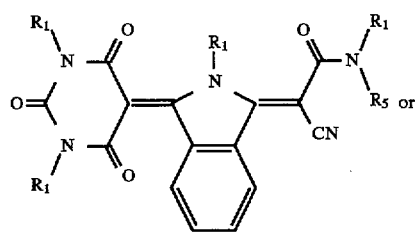  (V)

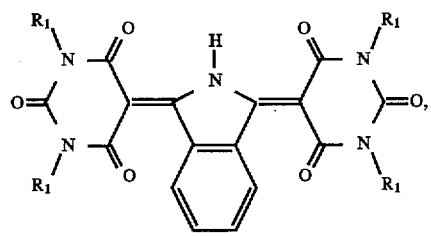  (VI)

wherein $R_5$ is a group

, $R_6$ is hydrogen, $C_1$–$C_{18}$-alkyl, benzyl or a group

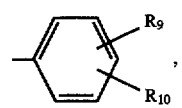, $R_7$, $R_8$, $R_9$ and $R_{10}$ are each independently of the other hydrogen, $C_1$–$C_{18}$-alkyl, $C_1$–$C_4$-alkoxy, halogen or trifluoromethyl, and $R_1$ has the same meaning as above;

5) an isoindolinone of the formula

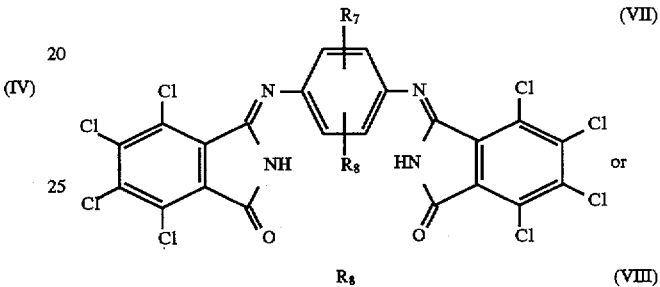  (VII)

or

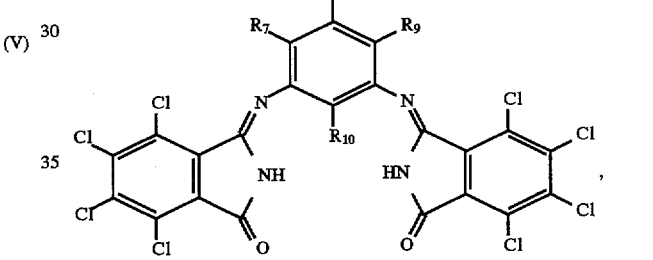  (VIII)

wherein $R_7$, $R_8$, $R_9$ and $R_{10}$ have the same meaning as above;

6) an indigo derivative of the formula

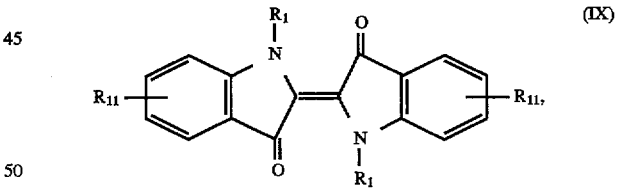  (IX)

wherein $R_{11}$ is hydrogen, CN, $C_1$–$C_4$-alkyl, $C_1$–$C_4$-alkoxy or halogen and $R_1$ has the same meaning as above;

7) a benzoimidazolone-azo compound of the formula

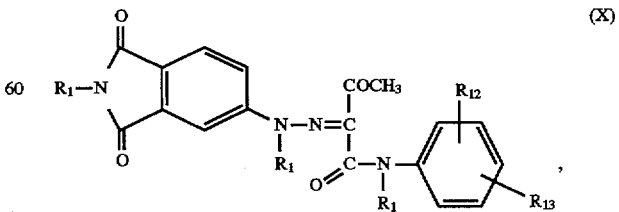  (X)

wherein $R_{12}$ and $R_{13}$ are each independently of the other hydrogen, halogen, $C_1$–$C_4$-alkyl or $C_1$–$C_4$- alkoxy and each $R_1$ has independently from the other the same meaning as above;

8) An anthraquinoide compound of the formula

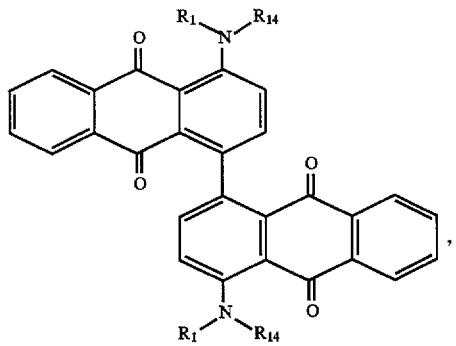
(XI)

wherein $R_1$ has the same meaning as above, and $R_{14}$ is hydrogen, $C_1$–$C_6$-alkyl, phenyl, benzyl or phenethyl which are unsubstituted or substituted by halogen;

9) a flavanthrone compound of the formula

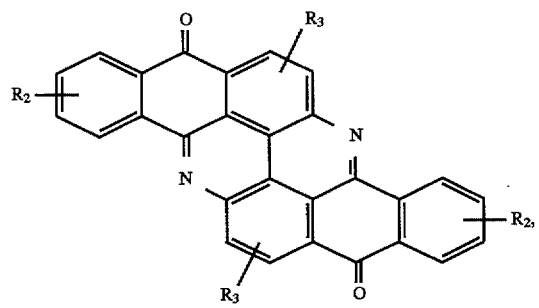
(XII)

wherein $R_2$ and $R_3$ have each independently of the other the same meaning as above;

10) An indanthrone compound of the formula

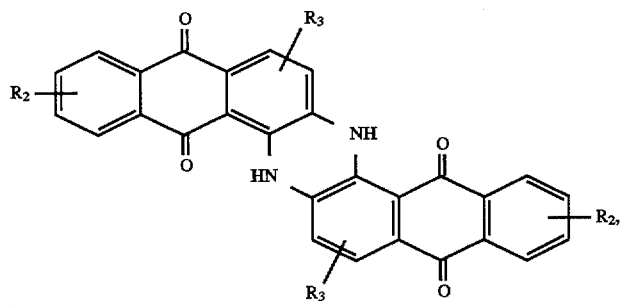
(XIII)

wherein $R_2$ and $R_3$ have each independently of the other the same meaning as above;

11) a phthalocyanine compound of the formula

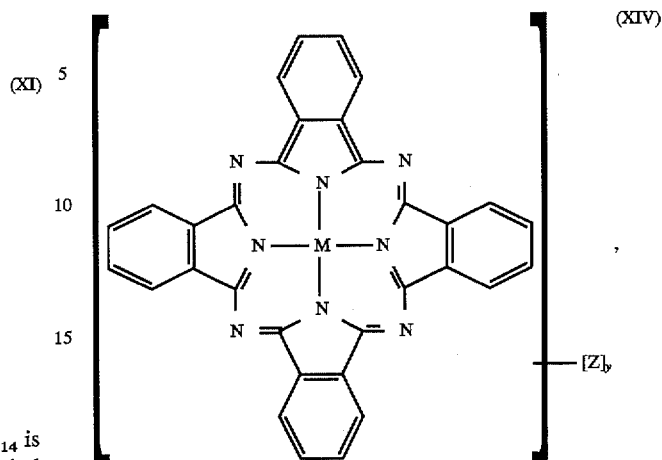
(XIV)

wherein M is $H_2$, Zn, Cu, Ni, Fe, Ti or V,

Z is halogen or a group —X—N($R_1$)($R_{15}$),

X is a direct bond, —CH($R_{16}$)— or —SO$_2$—, $R_1$ has the same meaning as above, $R_{15}$ is hydrogen, $C_1$–$C_4$-alkyl, —N($R_1$)$R_{16}$, —NHCOR$_{17}$, —COR$_{17}$ or

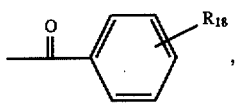

$R_{16}$ is hydrogen or $C_1$–$C_4$-alkyl, $R_{17}$ is $C_1$–$C_4$-alkyl or phenyl, $R_{18}$ is hydrogen, halogen, $C_1$–$C_4$-alkyl or $C_1$–$C_4$-alkoxy, and y is 0 or an integer from 1 to 4; and 12) a pyrrolo(3,4-c)pyrrole of the formula

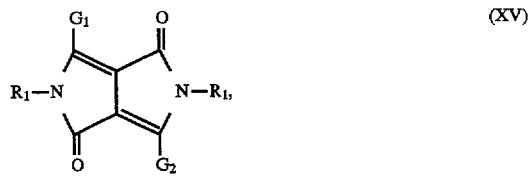
(XV)

wherein $G_1$ and $G_2$ are each independently of the other a group of formula

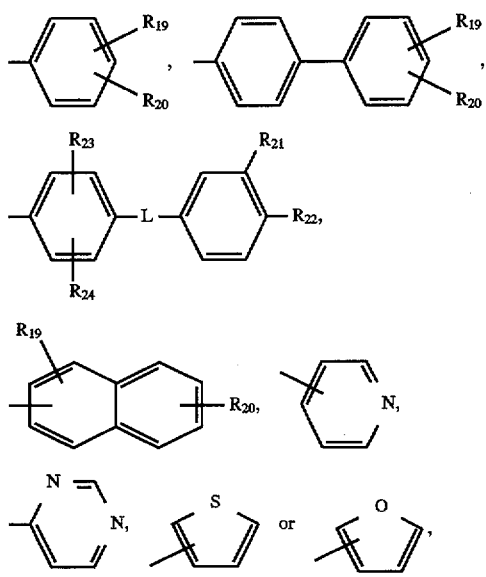

in which $R_{19}$ and $R_{20}$ are each independently of the other hydrogen, halogen, $C_1$–$C_{18}$-alkyl, $C_1$–$C_{18}$-alkoxy, $C_1$–$C_{18}$-alkylmercapto, $C_1$–$C_{18}$-alkylamino, $C_2$–$C_{18}$-dialkylamino, —CN, —NO$_2$, phenyl, trifluoromethyl, $C_5$–$C_6$-cycloalkyl, imidazolyl, pyrazolyl, triazolyl, piperazinyl, pyrrolyl, oxazolyl, benzoxazolyl, benzthiazolyl, benzimidazolyl, morpholinyl, piperadinyl, pyrrolidinyl, —C=N—($C_1$–$C_{18}$-alkyl) or

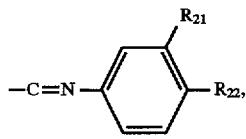

$R_{21}$ and $R_{22}$ are each independently of the other hydrogen, halogen, $C_1$–$C_6$-alkyl, $C_1$–$C_{18}$-alkoxy or —CN, $R_{23}$ and $R_{24}$ are each independently of the other hydrogen, halogen or $C_1$–$C_6$-alkyl, L is —CH$_2$—, —CH(CH$_3$)—, —C(CH$_3$)$_2$—, —CH=N—, —N=N—, —O—, —S—, —SO—, —SO$_2$— or —NR$_{25}$—, R$_{25}$ is hydrogen or $C_1$–$C_6$-alkyl, and $R_1$ has the same meaning as above.

15. A colored metallic pigment according to claim 14, wherein the organic pigment is a single pigment or a mixture of pigments selected from the group consisting of indanthrone, flavanthrone, quinacridone, phthalocyanine and pyrrolo(3,4-c)pyrrole pigments.

16. A colored metallic pigment according to claim 15, wherein the organic pigment is a single pigment or a mixture of pigments selected from the group consisting of quinacridone, phthalocyanine and pyrrolo(3,4-c)pyrrole pigments.

17. A method for producing a colored metallic pigment comprising a metallic core and a very fine, substantially continuous, uniform and homogeneous layer of organic pigment particles which is directly in contact with said metallic core by vacuum evaporation in an apparatus which is constructed or charged in such a way that the organic pigment gas or plasma flows toward the metallic core.

18. A method according to claim 17, wherein the vacuum evaporation is carried out by using a vacuum evaporation apparatus provided with a heated deflector and a vibrating unit.

19. A method according to claim 18, wherein the evaporation source and the heated deflector are unified via a horn-shaped tube around which a heating wire is wound, one end of said horn-shaped tube having an opening which is directed downwards and the other end being closed, the organic pigment being placed at the closed end and heated during vacuum evaporation by the heating wire.

20. A method according to claim 18, wherein the evaporation source and the heated deflector are unified via a cone-like or half spherical vessel fitted with a bottom having at least one opening, said vessel containing the organic pigment and being fitted with a heating unit, and the particles or flakes being placed in another vessel positioned below the first one.

21. A method according to claim 17, wherein the vacuum evaporation is carried out in a rotatable cylindrical tube charged with metallic particles or flakes and organic pigment, said tube being closed at both ends, rotated horizontally around its axis and heated.

22. A method according to claim 17, wherein the vacuum evaporation is carried out in a column-like vessel having at least one side branch provided with a heating unit, the organic pigment being placed at the bottom of the heated side branch and the metallic particles or flakes passing at least temporary in front of the side branch.

23. A pigment composition or masterbatch containing an effective coloring amount of a colored metallic pigment comprising a metallic core and a very fine, substantially continuous, uniform and homogeneous layer of organic pigment particles which is directly in contact with said metallic core.

24. A pigment composition according to claim 23, wherein the colored metallic pigment is encapsulated.

25. A method for coloring polymeric materials in the mass, wherein an effective coloring amount of a colored metallic pigment comprising a metallic core having a very fine, substantially continuous, uniform and homogeneous layer of organic pigment particles which is directly in contact with said metallic core is incorporated into said polymeric material.

26. A method according to claim 25, wherein said colored metallic pigment is in combination with another organic pigment or another effect pigment.

27. A colored metallic pigment according to claim 2, wherein the metallic core is a transition metal or metalloid having a negative oxidation potential or an alloy thereof.

28. A colored metallic pigment according to claim 27, wherein the metallic core is selected from the group consisting of scandium, titanium, vanadium, yttrium, manganese, iron, cobalt, nickel, zinc, zirconium, cadmium, lanthanum, aluminum, gallium, selenium, indium, antimony, tellurium and thallium and alloys thereof.

* * * * *